Oct. 11, 1927.

J. LEDWINKA 1,644,682

WEATHER STRIP FOR AUTOMOBILE DOORS

Filed Jan. 29, 1925

*INVENTOR.*
JOSEPH LEDWINKA
*BY*
*ATTORNEY.*

Patented Oct. 11, 1927.

1,644,682

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

WEATHER STRIP FOR AUTOMOBILE DOORS.

Application filed January 29, 1925. Serial No. 5,422.

This invention relates to window glass channels for automobile bodies, especially of the enclosed types, and has particular relation to weather-stripping and anti-rattling devices for the glass panes in the doors and windows of the automobile body.

Many devices have been designed and used heretofore for the purpose of weather-stripping the window frames and, at the same time, for preventing rattling of the glass panes in the frames. Most of these devices have been difficult to place in position and have involved the use of more or less involved surrounding supporting structures thus increasing the number of operations and the cost in the manufacture of the bodies at large.

It is an object of my invention to produce a new and improved housing for a channel liner for use in weather-proofing the window frames in the doors and bodies of the enclosed cars. It is another object of my invention to provide, in the case of window frames for the doors, a removable top rail section such that the weather-stripping and anti-rattling device may be readily, quickly and conveniently removed or replaced, and to provide, in the case of window frames for the bodies, a header construction having a removable section for the same purpose. Still another object of my invention is to provide an improved weather-stripping channel and a liner therefor which are comparatively inexpensive to manufacture and which can be readily applied to automobile bodies without in any manner affecting their usual constructional features.

The invention consists in the novel construction, combination and devices to be hereinafter described and claimed for carrying out the above stated objects, and other such objects as will appear from the following description of a preferred embodiment illustrated in the accompanying drawings, in which Figure 1 is a side elevation of an automobile equipped with my weather stripping device;

Figure 1:
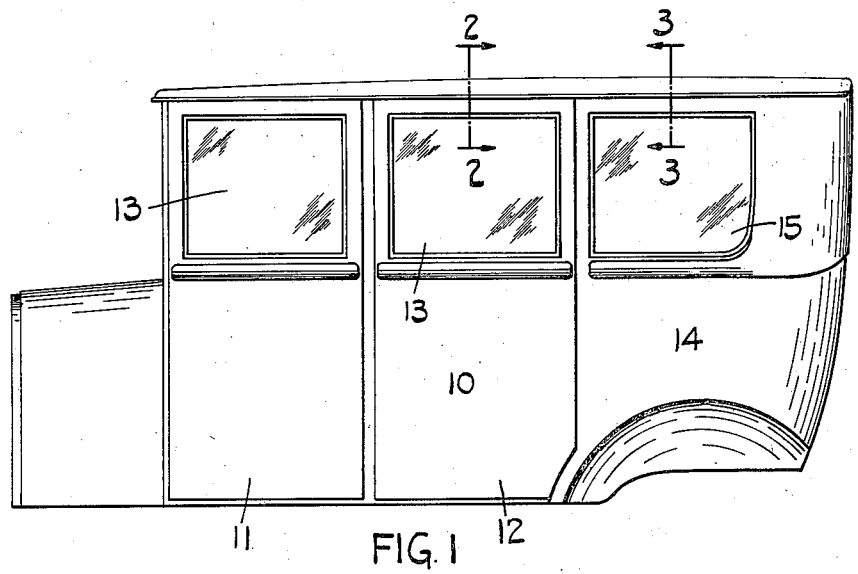
Figure 2:
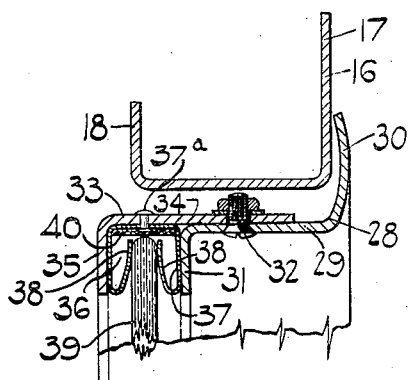
Figure 2 is an enlarged sectional view on the line 2—2 of Fig. 1.
Figure 3:
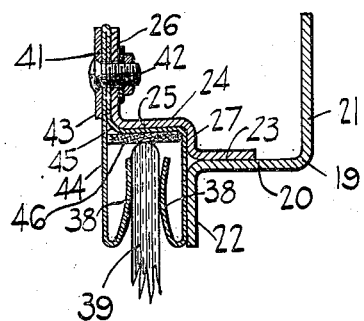
Figure 3 is an enlarged sectional view on the line 3—3 of Fig. 1.

In general, my invention consists in the provision of a channel structure so designed as to carry therein the element or elements which make up the weather-proofing and anti-rattling device. Due to inherent structural differences in the doors and the bodies proper of the vehicle, the channel as used in the door window frame is modified somewhat to be used in the window in the tonneau portion of the automobile. The two structures are shown in Figs. 2 and 3, the former figure showing the construction as used in the door and the latter showing the construction as used in the side of the automobile tonneau. Both constructions include a removable element which is, together with the adjacent automobile body structure, adapted to complete the formation of the weather stripping supporting structure. Through the removal of this element the weather stripping or anti-rattling device may be removed or replaced.

Referring specifically to the accompanying drawing, wherein similar reference characters indicate similar parts throughout the several views, 10 indicates an automobile body of the sedan type having front and rear doors 11 and 12 respectively. Each of these doors is provided with a window 13 in its upper half, this window being of the type which is vertically movable in the plane of the door to either open or closed position. The rear quarter portion 14 of the body is also provided with a window 15.

The top of the door openings is constituted by the top rail or header member 16 which is of channel formation having side walls 17 and 18. Along the top of the rear quarter 14 of the body is another header member 19 of substantially Z shaped cross-section having a main body portion or web 20 and upwardly and downwardly extending arms 21 and 22, respectively, at opposite sides of the main body. Secured to the main body 20, as by welding indicated at 23, is a substantially S shaped member 24 coextensive with the header member 19. This member 24 comprises a body portion 25 having an upwardly extending portion 26 at one side thereof and a downwardly extending portion 27 at the other side thereof, this latter portion lying in the same vertical plane as does the arm 22. The portions 21, 20, 25 and 26 form the rear quarter header and are joined in appropriate manner to the header members 16.

Each of the doors is provided at its top with a substantially Z shaped top rail 28 having a main body or shelf 29, an upwardly extending arm 30 at one side thereof overlapping the lower outer surface of the channel wall 17, and a downwardly extending arm 31 at the opposite side thereof.

Secured to the main body 29 by means of removable studs or bolts 32 is an angle-shaped element 33 having a horizontally disposed branch 34 and a downwardly disposed branch 35 at one side thereof. The branch 34 is of sufficient width as will permit it to be secured to the body 29 of the door rail and yet to overhang it to such an extent as to form a channel 36 having side walls 31 and 35.

Disposed within this channel 36 and suitably secured therein as by rivets 37ª through the branch 34 is a flexible metallic strip 37 having inturned lip portions 38 which are adapted to engage the sides of the upper edge of the glass window pane 39 and effectually preclude its rattling. A felt strip 40 is secured in the base of the channel strip 37 for contact with the upper edge of the pane. By this construction not only is a cushion provided for the top of the glass whereby to prevent its fracture should it be raised too suddenly against the top of the window frame, but also there is provided an effective weather-proofing.

In the rear quarter body portion the construction is somewhat different. The upwardly extending portion 26 is suitably apertured as at 41 to receive studs or bolts 42. Removably secured to the portion 26 is a member 43 between which and the portion 26 is clamped a flexible metallic strip comprising the two sections 44 and 45 each provided with the inturned lips 38 as in the door window frame construction. These strips 44 and 45 may be secured by riveting to the element 43 or they may be merely clamped as is preferable, between the elements 26 and 43. A felt strip 46 is provided similar in nature to the strip 40.

It will be seen that by my invention a channel has been devised for reception of a weather-stripping and anti-rattling element which has separable elements. Should it be found desirable to remove the weather strip for purposes of renewal or replacement, all that is necessary to be done is to remove the element 33 in the case of the door window frame or the element 43 in the case of the rear quarter body window frame. This has been accomplished by an exceedingly simple construction, which may be readily applied to existing body structures and which is inexpensive to manufacture.

While I have described my invention in detail using for illustration a preferred form it is, of course, understood that it comprehends such variations in form and arrangement of parts as is commensurate with the scope of the appended claims.

What I claim is:

1. A window frame for vehicles having a top rail disposed laterally of the plane of the window glass, a top weather-strip adapted to receive and weather-proof the top of the glass, and an angle shaped support for said weather strip in its entirety removably secured to said top rail.

2. A window frame for vehicles having a top rail disposed laterally of the plane of the window glass, a top weather strip adapted to receive and weather-proof the top of the glass, and an angle shaped unitary support for said weather strip in its entirety removably secured to said top rail.

3. A door window frame comprising door side panels having relatively fixed glass-run channels thereon, a door top rail flanking the free space in the plane of said glass runs whereby the window glass may be placed and removed by way of the top rail, a supporting member removably secured to the top rail and overhanging the said free space, and a weather strip carried in its entirety by said supporting member in a position to normally receive the upper edge of the window glass.

4. In a window casing, a rail at the top thereof, a depending flange to one side thereof, an angle bar, a flexible metallic strip having a base portion, side portions, and inwardly turned lips secured to said angle bar, and means for detachably securing said angle bar upon said rail whereby the base and side portions of said flexible strip are enclosed by said angle bar and said depending flange.

5. In combination, a window casing having an outwardly extending shelf at its upper end, an element detachably secured to said shelf and having a portion thereof overlying the inner edge of said shelf, a depending flange on said overlying portion; and a metallic weather strip intermediate said depending flange and the upper end of said window casing.

6. In combination, a window casing having an outwardly extending shelf and a depending portion at the forward edge thereof, an element mounted upon said shelf and having a portion overhanging said depending portion, a flexible metallic strip beneath said overhanging portion, means for securing said strip to said overhanging portion, and means for detachably securing said element upon said shelf.

In testimony whereof I hereunto affix my signature.

JOSEPH LEDWINKA.